United States Patent [19]

Murayama et al.

[11] 3,903,733
[45] Sept. 9, 1975

[54] METHOD OF MEASURING VIBRATIONS BY MEANS OF PIEZOELECTRIC BODY AND THE APPARATUS THEREFOR

[75] Inventors: Naohiro Murayama; Takao Oikawa, both of Iwaki, Japan

[73] Assignee: Kureha Kagaku Kogyo K.K., Tokyo, Japan

[22] Filed: Nov. 20, 1973

[21] Appl. No.: 417,676

[30] Foreign Application Priority Data
Nov. 20, 1972 Japan............................ 47-116328

[52] U.S. Cl................................ 73/71.4; 73/DIG. 4
[51] Int. Cl.............................................. G01h 1/00
[58] Field of Search..... 73/88.5 R, 88.55 D, DIG. 4, 73/71.4; 179/110 A

[56] References Cited
UNITED STATES PATENTS

| | | | |
|---|---|---|---|
| 2,558,563 | 6/1951 | Janssen...................... | 73/DIG. 4 X |
| 2,702,354 | 2/1955 | Chorpening................. | 73/71.4 X |
| 3,174,125 | 3/1965 | Curby......................... | 73/88.5 R X |
| 3,274,528 | 9/1966 | Bermann..................... | 73/88.5 R X |
| 3,351,880 | 11/1967 | Wilner........................ | 73/88.55 D X |
| 3,365,593 | 1/1968 | Roof et al................... | 73/DIG. 4 X |
| 3,527,099 | 9/1970 | Herceg........................ | 73/88.5 R X |
| 3,750,127 | 7/1973 | Ayers et al.................. | 73/DIG. 4 X |
| 3,792,204 | 2/1974 | Murayama et al........... | 179/110 A |

*Primary Examiner*—Charles A. Ruehl
*Attorney, Agent, or Firm*—Sughrue, Rothwell, Mion, Zinn and Macpeak

[57] ABSTRACT

Method of measuring mechanical vibrations comprises forming an electric circuit including as its terminals electrodes provided on both sides of a high molecular piezoelectric body, coupling said piezoelectric body entirely or partially to a vibrating body to be measured, and measuring or detecting the mechanical vibrations by transforming them into changes in an electric quantity or in voltage. Measuring apparatus for use with the above method are also disclosed comprising a high molecular piezoelectric body the terminals of which are connected by way of an FET to a measuring or detecting device.

13 Claims, 6 Drawing Figures

METHOD OF MEASURING VIBRATIONS BY MEANS OF PIEZOELECTRIC BODY AND THE APPARATUS THEREFOR

BACKGROUND OF THE INVENTION

1. Field of the Invention

This invention relates to a quite novel method of measuring vibrations using a high molecular piezoelectric body.

More particularly, this invention relates to a method of measuring vibrations which comprises forming an electric circuit including as its terminals a pair of electrodes provided on both sides of a high molecular piezoelectric body, coupling said piezoelectric body partially or entirely to a vibrating body to be tested and converting the mechanical vibrations into changes in an electric quantity or voltage.

This invention further relates to an apparatus for use with said method of measuring vibrations using the high molecular piezoelectric body and more particularly to such an apparatus comprising the piezoelectric body combined with FET and/or a relay circuit.

2. Description of the Prior Art

Various types of pick-ups for use with vibrometers employing various principles have been proposed so far, such as a capacitance type, magnetostrictive type, photoelectric type, piezoelectric type using inorganic crystals or ceramics, strain gage type using resistor wire and the like.

Each of these prior vibrometer pick-ups has, however, inherent disadvantages. Pick-ups other than those of the piezoelectric type are particularly complicated in their structures and difficult to design. Moreover, there are inevitable limitations in measuring the vibrations of vibrating bodies at desired location and having various surface configurations with the piezoelectric type pick-up of relatively simple structure as well as with other types of pick-ups. In addition, capacitance type, magneto-strictive type, photoelectric type and piezoelectric type pick-ups have the defects that their resonance frequency is low and the region of the measuring frequency is narrow because of their considerable mass, and said mass affects the vibrations of the vibration body to be tested.

SUMMARY OF THE INVENTION

The inventors have succeeded, by the use of a high molecular piezoelectric body as a gage element, in developing an excellent pick-up for a vibrometer which can follow the changes in distortion even with the vibrations in very high frequency range, with higher fidelity and with no effects on the vibrations of the vibration body to be tested because of the element's extremely light weight, and can measure the vibrations at any desired location of the vibrating body and with any surface configuration thereof.

Moreover, since the high molecular piezoelectric bodies have low elastic constant and take the form of thin film, no great stress is required for displacement thereof, and the vibrations of the vibrating body are not affected.

While the conventional Rochelle salt, quartz crystal, piezoelectric ceramics (PZT, for example), etc. have an elastic coefficient ranging over $20 - 80 \times 10^{10}$ dyne/cm$^2$, a high molecular piezoelectric body is a very soft substance, and the elastic coefficient thereof can be less than $5 \times 10^{10}$ dyne/cm$^2$, even with electrodes attached thereto, and can be used in a thin film less than 100 micron, and, in particular, less than several microns. Since it is difficult to obtain a thin inorganic film less than 100 micron, this means that an extremely soft film, which is several tens of times as soft as a conventional film, can be obtained. Such a film has not been known before.

Accordingly, a high molecular piezoelectric element, different from ceramics, etc., can not only be fabricated as a very thin film with any configuration, but such an element also precisely follows the changes in vibrational distortions in an extremely high frequency region because of its extreme light weight and does not affect the vibrations of the vibration body to be measured because of one low elastic coefficient of the element.

Therefore, the apparatus according to this invention can measure or detect even small vibrations with higher sensitivity and accuracy by combining with a detector a high molecular piezoelectric element provided with electrodes on both sides thereof.

The present apparatus can detect slight changes in the vibrations of a vibrating body to be tested and, therefore, can be utilized for detecting the changes in the vibrations with elapsed time and also abnormal vibrations, as well as determining the distribution of the stress exerted on each of the various portions of the vibrating body as it vibrates, by mounting a high molecular piezoelectric element of this invention on the corresponding portions of said vibrating body. It is also applicable to detecting so called "cavities", that is, the differences in internal densities in steel materials and the like, by applying certain vibrations to the materials and measuring the differences in the resulting vibrations at each of the portions.

DESCRIPTION OF THE PREFERRED EMBODIMENT

High molecular polar substances such as polyvinylidene fluoride (referred to as PVDF hereinafter), polyvinylfluoride, polyvinylidene chloride, polyvinylchloride, nylon 11 and the like are known to produce a piezoelectric body upon application to sheets or films thereof a polarization effect such as by applying a high stationary electric field while heating the substance.

Figure 1:
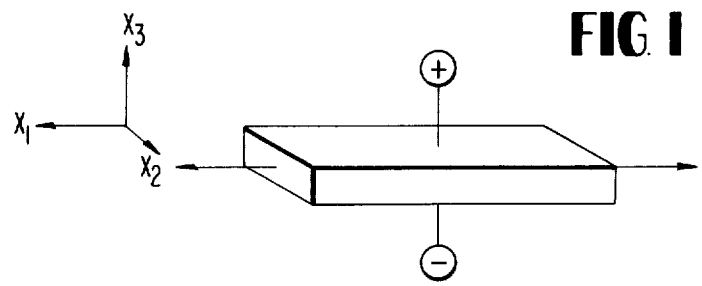
FIG. 1 is an illustrative view for the piezoelectric effect of a high molecular piezoelectric element used in this invention.

Any of these piezo elements shows the piezoelectric effect of expansion type. In a piezoelectric element produced from a mono-axially oriented film or sheet, a significant piezoelectric effect can be observed as polarization $d_{31}$ ($d$ represents the piezoelectric constant) along the axis $X_3$ when the stress is applied along the axis $X_1$ as shown in FIG. 1, wherein axes $X_1$, $X_2$ and $X_3$ indicate the directions of orientation, width and depth respectively.

Although $d_{32}$ is not zero, it is usually only on the order of about $1/10 - 1/20$ of $d_{31}$.

This anisotropy is scarcely found in a non-oriented or biaxially oriented film or sheet.

It has been discovered by the inventors that a sheet or film made of PVDF series resin processed under the properly chosen conditions can provide a piezoelectric body having a piezoelectric constant $d_{31}$ of more than $1 \times 10^{-7}$ cgsesu (maximum $2 \times 10^{-6}$ cgsesu) with mono-axially orientation and of more than $5 \times 10^{-8}$ cgsesu with non-orientation and biaxial orientation, thereby enabling application in a wide variety of fields.

Figure 2:
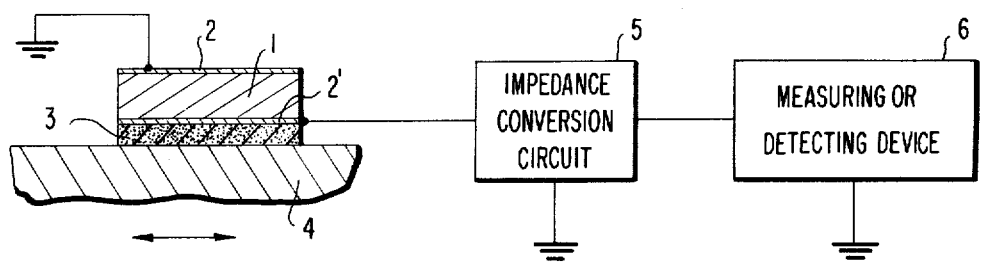
FIG. 2, FIG. 3 and FIG. 4 are block diagrams of measuring circuits representing the principle of the method for measuring the vibrations according to this invention respectively.

Particularly in PVDF material, it is desired to select and polarize a film of beta-type crystal structure since it provides an especially high piezoelectric constant. PVDF series resin, of course, includes copolymers thereof comprising PVDF as the basic component. Such a piezoelectric film has the piezoelectric characteristics of the expansion-contraction type which are quite different from the effect of stretched synthetic polypeptide films having piezoelectric characteristics of the Face Shear type as disclosed in French Pat. No. 2000770. A special design is required for the element of the latter type and in the construction as shown in FIG. 2, for example, wherein the piezoelectric body is provided with electrodes at both sides thereof, it can deliver only extremely low signals as a vibration pick-up because the signals in the different phases meeting at right angles off set each other. Moreover, it is confirmed that the piezoelectricity thereof is small.

The principle of the vibrometer pick-up in which a high molecular piezoelectric body is used as a gage element is to be described referring to FIG. 2.

In FIG. 2, reference number 1 indicates a high molecular piezoelectric body as a gage element having electrodes 2 and 2' of in the form of conductive layers on both sides of the body and applied by a known process, such as vapor deposition of a film. Reference number 3 designates an adhesive layer, consisting of adhesive tape having adhesive on both sides or other suitable adhesives, for attaching the gage element to the vibrating body 4 to be tested. Simply, the adhesive layer is prepared by applying a suitable pressure-sensitive adhesive 3 to the surface of the electrode 2' and securing the same to another base film. Then, it is used by peeling off said base film.

The materials for adhesives or the adhesive tapes should, of course, be selected properly so that no great stress is required for their distortion as compared with that of the vibrating body to be tested. The gage element may be mounted to the vibrating body to be tested by means other than adhesives. The vibrations are applied to the pick-up, for example, in the direction shown by the arrow in FIG. 2.

In measuring the vibrations of the vibrating body to be tested in a certain direction, a high molecular piezoelectric body produced from a mono-axially oriented film is used as the gage element aligning the direction of orientation to that of the vibrations.

In measuring the vibrations in unspecified directions, a high molecular piezoelectric body having no anisotropy in piezoelectricity produced from a non-oriented or biaxially oriented film is preferred as the gage element.

The electric field generated by such vibrations is delivered through an adequate impedance conversion circuit 5 and measured or detected by a measuring or detecting device 6, such as a voltmeter, recorder, oscilloscope and the like, and the displacement produced in the vibrations is determined by way of the predetermined relationships between the distortion and the output voltage in the pick-up. In addition, by the use of a recorder or oscilloscope, frequency can be measured and an accurate wave form can be measured by using a suitable integration circuit.

Figure 3:
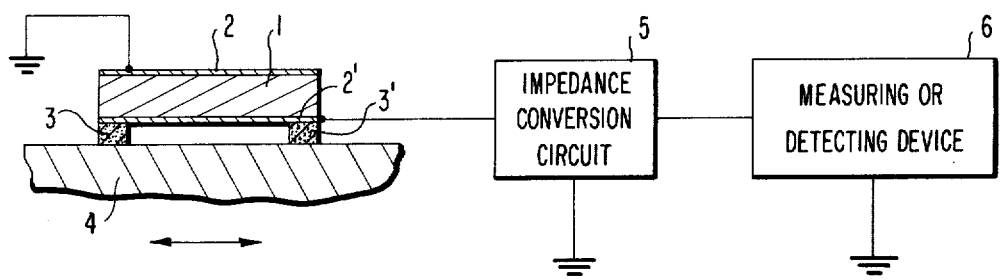

The vibrometer pick-up according to this invention includes also the embodiment shown in FIG. 3 in addition to that in FIG. 2.

In FIG. 3, the high molecular piezoelectric body 1 has electrodes 2, 2' on both sides thereof and partially attached to the vibrating body 4 to be tested by way of adhesive materials 3, 3'. The pick-up may be mounted to the vibration body in any suitable way, such as threading by small screws or providing clamping means in addition to said adhesion. The high molecular piezoelectric body 1 of the gage element may be coupled at one end thereof to the vibrating body 4 to be tested and fixed at the other end thereof to the stationary body 7 as shown in FIG. 4.

Figure 4:
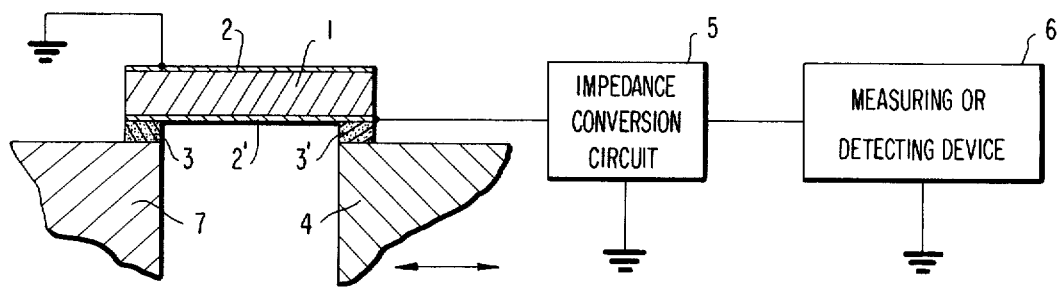

In FIG. 4, 1 is a high molecular piezoelectric body having conductive electrodes 2, 2' on both sides thereof provided by the a known process, such as vapor deposition of metal films. One end of the pick-up is fixed by both sides of an adhesion tape or adhesive 3, or fixed by conventional securing means, such as small screws, clamps, etc., to the stationary body 7.

The other end of the pick-up is fixed to the vibrating body 4 to be tested by way of the adhesion portion 3', in the same way as said one end is secured to the stationary body 7. The vibrations of the vibrating body shown by the arrow in FIG. 2 are thus transmitted through such construction to the pick-up.

The generated voltage is delivered through an adequate impedance conversion circuit 5 and detected or measured by a measuring or detecting device 6 such as a voltmeter, recorder, oscilloscope and the like, and the amplitude of the vibrations is determined by way of a predetermined relationship between distortion and output voltage in the pick-up.

It is, of course, possible to measure the frequency of the vibrations by the use of the recorder or oscilloscope and to measure the wave form thereof by the use of an appropriate integrator.

In the vibrator measurement according to this invention, one end of the pick-up is secured to the stationary body and the change in the distance between the vibration body to be tested and the stationary body is equal to the displacement applied to the entire length of the pick-up. Therefore, large displacement is exerted on the pick-up, thus generating a high output voltage, and thus enabling the measurement or determination of even extremely weak vibrations of the vibrating body to be tested.

The apparatus according to this invention is very simple in its construction, capable of measuring an extremely wide frequency range, and the frequency characteristic thereof is flat over the wide frequency range. Moreover, it has higher sensitivity and accuracy because of its high output voltage. It should particularly be noted that the apparatus according to this invention can be fabricated inexpensively notwithstanding the foregoing highly advantageous features.

It is desirable to apply a shield on the entire system of the pick-up according to this invention to eliminate noise as much as possible when it is used for measuring, because electric fields or the changes in capacitance, if any, in the vicinity thereof, may cause the errors in measuring.

In the process according to this invention described above, an FET (field effect transistor) is desirably used as the impedance conversion circuit and the detecting device is formed by combining these elements.

Figure 5:
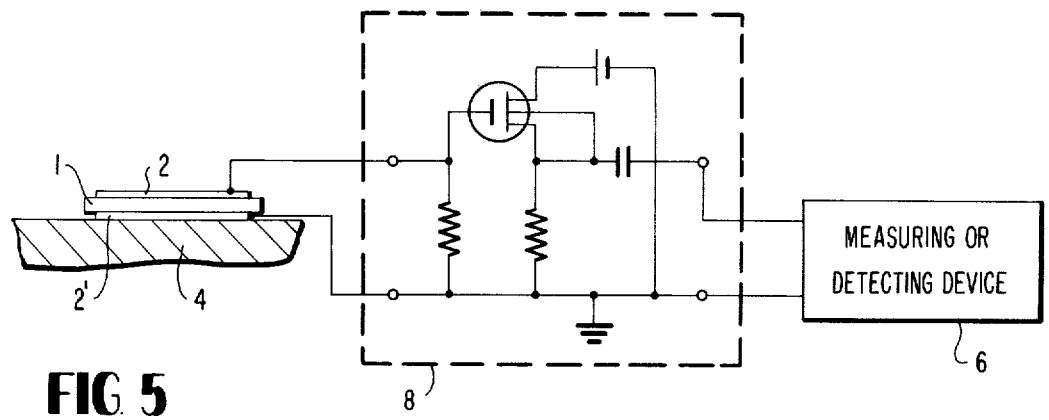
FIG. 5 and FIG. 6 are block diagrams of embodiments of vibration measuring apparatus according to this invention.

An embodiment of this invention is to be described referring to FIG. 5, wherein 1 is a high molecular piezoelectric body provided with electrodes 2, 2' on both sides thereof. Reference number 8 is a FET circuit and 6 designates an measuring or detecting device.

In using the apparatus according to this invention, the high molecular piezoelectric body which is provided with electrodes is mounted to the vibrating body 4 to be detected. It may be mounted by using a two-sided adhesive tape or adhesives, or by usual securing means such as small screws, clamps, etc. The changes in vibrations of the vibrating body to be detected is converted into voltage by said piezoelectric body through such a construction.

The voltage generated is delivered, for example, through the FET and measured or detected by the measuring or detecting device 6 such as voltmeter, recorder oscilloscope, or the like. It can also actuate an alarm by combining it with a relay circuit.

More specifically, a high molecular piezoelectric body is partially or entirely coupled to the vibrating body to thereby transform the changes in the vibrations to changes in voltage. If a predetermined voltage level is exceeded by the generation of abnormal vibrations and the like, the alarm connected to said piezoelectric body is actuated to indicate the abnormal vibrations in the vibrating body. For the above construction, the FET is provided between said piezoelectric body and the relay circuit for the actuation of the alarm in order to convert the impedance so that the relay circuit connected to the alarm may be operated by the voltage produced in the piezoelectric body.

Figure 6:
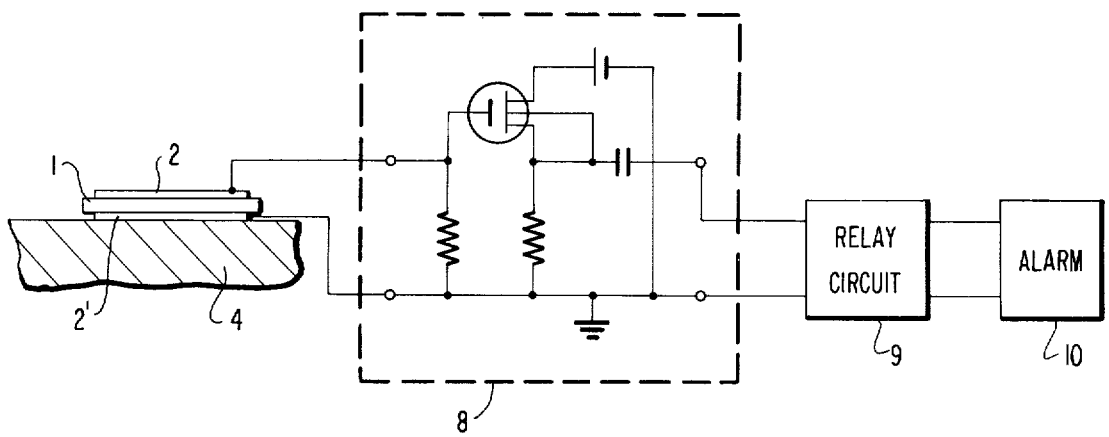

The direct coupling of the piezoelectric body to an adequate relay circuit can also actuate the alarm. Referring now to FIG. 6 showing another embodiment of this invention, 1 is a high molecular piezoelectric body provided with electrodes 2, 2' of conductive layer as terminals on both sides thereof according to the known process such as the vapor deposition of the metal films. The terminals are mounted on the vibration body 4, when measuring is practiced, by way of the seizing using both sides adhesion tape or adequate adhesives or by the conventional securing means such as small screws or clamps. The terminals are also connected by way of the FET 8 to the relay circuit 9 which is, in turn, connected to the alarm 10 and actuates the alarm when a predetermined of voltage level is attained. Various conventional means, for example, a voltmeter may be used as the relay circuit. The voltmeter employed herein is built in the circuit in such a way that the indicator thereof actuates the alarm when a predetermined voltage level is exceeded.

The vibrations of the vibration body 4 are transformed by way of the high molecular piezoelectric body and delivered through the FET 8 to the voltmeter and detected with the changes of the amplitude in the vibrations as those in the voltage. When the abnormal vibrations are generated in the vibration body to thereby generate a voltage exceeding the predetermined level, the indicator of the voltmeter completes the circuit for the alarm to actuates the alarm.

EXAMPLE

A mono-axially oriented PVDF film is provided with electrodes 2, 2' on both sides thereof by aluminum deposition as shown in FIG. 2 and then subjected to a stationary electric field of 500KV/cm under heating to obtain a piezoelectric body having piezoelectric constant $d_{31}$: $4.0 \times 10^{-7}$ cgsesu.

A vibrometer pick-up shown in FIG. 2 is fabricated using said piezoelectric body ($70 \times 10 \times 0.01$ mm$^3$). The vibrating body 4 to be tested is made of aluminum sheet ($80 \times 12 \times 1$ mm$^3$) and is fixed to said gage element by way of adhesion material 3 made of a two-sided adhesion tape.

One end of said aluminim sheet is fixed and the other end thereof is subjected to sinusoidal vibrations of 10 Hz to 100 Hz by using a vibrator while the vibrations are increased from 10 Hz to 100 Hz by the steps of 10 Hz.

The voltage generated is applied to the impedance conversion circuit through an FET (field effect transistor) and then measured using an oscilloscope. The wave form having the same frequency as that applied to the aluminum sheet is observed to follow up with high accuracy. The frequency characteristics are flat. The amplitude of the vibrations in the aluminum sheet predetermined from the relation between the distortion and output voltage in the pick-up always shows a constant value of 4.8 micron/cm irrespective of the changes in the frequency. The amplitude determined from the strain gage provided as a reference in the vibrator is 5 micron/cm.

EXAMPLE

A mono-axially oriented PVDF film is provided with electrodes 2, 2' on both sides thereof by aluminim deposition as shown in FIG. 4 and then subjected to a stationary, i.e., d.c. electric field of 500KV/cm under heating to obtain a piezoelectric body of a size of $70 \times 10 \times 0.01$ mm$^3$ and having the piezoelectric constant $d_{31}$ : $4.0 \times 10^{-7}$ cgsesu.

The piezoelectric body is fixed at its one end to the stationary body 7 and fixed at the other end to the aluminum sheet 4 which is, in turn, coupled to the vibrator. For the adhesives 3, 3', two-sided adhesion tape is used.

A vibrator is operated to produce sinusoidal vibrations of 1 Hz to 100 Hz and the voltage generated is passed through the FET circuit 5 for the impedance conversion and then detected by the oscilloscope 6. A high output voltage per unit displacement (quantity of displacement/length in piezoelectric body; micron/cm) of 0.016 mV is obtained. The frequency characteristics up to said 100 Hz are flat and the follow up characteristics for the changes in the frequency are extremely sharp.

What is claimed is:

1. Apparatus for detecting vibrations comprising an electrically polarized high molecular polymer piezoelectric body subject to the vibrations and provided with electrodes on opposite sides thereof, said body converting the vibration to corresponding voltage variations between said electrodes, and detector means for detecting the voltage variations.

2. Apparatus as defined in claim 1 in which said high molecular piezoelectric body provided with electrodes at opposite sides thereof is fixed to a vibrating body by pressure sensitive adhesives previously applied on one side thereof.

3. Apparatus as defined in claim 1, wherein said piezoelectric body is an electrically polarized polyvinylidene fluoride film.

4. Apparatus as defined in claim 3, wherein said film has a piezoelectric constant of approximately $4.0 \times 10^{-7}$ cgsesu.

5. Apparatus as defined in claim 3 wherein said film is monoaxially oriented and has a piezoelectric constant of between $1 \times 10^{-7}$ and $2 \times 10^{-6}$ cgsesu.

6. Apparatus as defined in claim 1, further comprising field effect transistor circuit means connected to said electrodes for coupling the voltage variations to said detector means.

7. Apparatus as defined in claim 6 wherein said detector means comprises an alarm device, and further comprising voltagesensitive means coupled between said circuit means and said alarm device for energizing said alarm device when the level of the voltage variations exceeds a predetermined value.

8. Apparatus as defined in claim 6, wherein said piezoelectric body is an electrically polarized polyvinylidene fluoride film.

9. A method of measuring mechanical vibrations comprising:

polarizing a high molecular polymer piezoelectric body by applying a d.c. electric field thereto;

forming an electric circuit including electrodes secured to opposite sides of the polarized body;

mechanically coupling the polarized body to a mechanically vibrating body, whereby the mechanical vibrations of the body are converted into corresponding electrical changes in the electrical circuit; and detecting the electrical changes as a measure of the mechanical vibrations.

10. A method as defined in claim 9, further comprising the step of selecting the high molecular piezoelectric body as a high polymer polyvinylidene fluoride film.

11. A method as defined in claim 10, wherein the field-applying step comprises applying a field of approximately 500 KV/cm to produce piezoelectric constant of approximately $4.0 \times 10^{-7}$ cgsesu in said piezoelectric body.

12. A method as defined in claim 10 wherein said film is monoaxially oriented, and wherein said field-applying step produces in said film a piezoelectric constant of between $1 \times 10^{-7}$ and $2 \times 10^{-6}$ cgsesu.

13. A method as defined in claim 9, wherein the coupling step further comprises fixing one end of the polarized body to a stationary body and the other end to the vibrating body.

* * * * *